United States Patent [19]

Kohama et al.

[11] 4,226,222
[45] Oct. 7, 1980

[54] EXHAUST GAS RECIRCULATION SYSTEM FOR INTERNAL COMBUSTION ENGINES

[75] Inventors: Tokio Kohama, Nishio; Takeshi Matsui, Aichi; Hisasi Kawai, Toyohashi; Akira Nishimatsu, Aichi; Toshikazu Ina, Okazaki; Hidetaka Nohira; Kiyoshi Kobashi, both of Mishima, all of Japan

[73] Assignees: Nippon Soken, Inc., Nishio; Toyota Jidosha Kogyo Kabushiki Kaisha, Toyota, both of Japan

[21] Appl. No.: 30,606

[22] Filed: Apr. 11, 1979

[30] Foreign Application Priority Data

Apr. 14, 1978 [JP] Japan .................................. 53-44445

[51] Int. Cl.³ ............................................ F02M 25/06
[52] U.S. Cl. ................................................... 123/568
[58] Field of Search ..................................... 123/119 A

[56] References Cited

U.S. PATENT DOCUMENTS

| | | | |
|---|---|---|---|
| 4,100,891 | 7/1978 | Williams | 123/119 A |
| 4,112,894 | 9/1978 | Nohira | 123/119 A |
| 4,128,885 | 12/1978 | Valek et al. | 123/119 A |
| 4,142,495 | 3/1979 | Lahiff | 123/119 A |
| 4,144,856 | 3/1979 | Tsukamoto et al. | 123/119 A |
| 4,161,929 | 7/1979 | Nohira et al. | 123/119 A |
| 4,165,722 | 8/1979 | Aoyama | 123/119 A |
| 4,171,691 | 10/1979 | Nohira et al. | 123/119 A |

*Primary Examiner*—Wendell E. Burns
*Attorney, Agent, or Firm*—Cushman, Darby & Cushman

[57] ABSTRACT

In an exhaust gas recirculation system for an internal combustion engine, the flow quantity of exhaust gases recirculated from an exhaust pipe into an induction pipe through a recirculation pipe is controlled in relation to exhaust pressure in the recirculation pipe in accordance with pneumatic pressure defined by a value calculated in a digital computer taking account of negative pressure in the induction pipe and rotational speed of the engine.

6 Claims, 11 Drawing Figures

EXHAUST GAS RECIRCULATION SYSTEM FOR INTERNAL COMBUSTION ENGINES

BACKGROUND OF THE INVENTION

The present invention relates to an exhaust gas recirculation system for an internal combustion engine of a vehicle, and more particularly to an exhaust gas recirculation system in which a recirculation pipe is provided to recirculate therethrough exhaust gases from an exhaust pipe into an induction pipe.

In such an exhaust gas recirculation system, it has been proposed that to reduce the nitrogen oxide content of exhaust emissions from the vehicle, flow control means may be adapted to control the flow quantity of exhaust gases through the recirculation pipe in accordance with changes of negative pressure from the induction pipe in relation to exhaust pressure appearing in the recirculation pipe upstream of the flow control means. However, with such a system, it is observed that reduction of the nitrogen oxide content of exhaust emissions inevitably disturbs good driveability of the vehicle and causes unnecessary fuel consumption.

It is, therefore, required that the flow quantity of exhaust gases through the recirculation pipe is precisely controlled in accordance with various changes of operative conditions of the engine to continuously ensure good driveability and proper fuel consumption.

SUMMARY OF THE INVENTION

It is the primary object of the present invention to provide an exhaust gas recirculation system in which the flow quantity of exhaust gases through the recirculation pipe is controlled in relation to exhaust pressure in the recirculation pipe in accordance with pneumatic pressure defined by a value calculated in a digital computer taking account of negative pressure in the induction pipe and rotational speed of the engine.

According to the present invention, there is provided an exhaust gas recirculation system for an internal combustion engine having an induction pipe for conducting air-fuel mixture into a combustion chamber of the engine and an exhaust pipe for discharging exhaust gases from the combustion chamber therethrough, which system comprises:

a recirculation pipe leading the exhaust pipe to the induction pipe to recirculate exhaust gases into the combustion chamber of the engine therethrough;

first flow control means for controlling the flow quantity of exhaust gases through the recirculation pipe in accordance with changes of negative pressure applied thereto from the induction pipe in relation to exhaust pressure value appearing in the recirculation pipe at the upstream of the first flow control means; and second flow control means for controlling the flow quantity of exhaust gases through the recirculation pipe in accordance with pneumatic pressure applied thereto, the second flow control means including first and second electrically operated valves to be selectively energized to apply the negative pressure and the atmospheric pressure respectively from the induction pipe and the exterior to the second flow control means to control the pneumatic pressure;

an electric control apparatus for the system comprising:

a first detector for detecting rotational speed of the engine to produce a first electric signal indicative of the rotational speed of the engine;

a second detector for detecting negative pressure in the induction pipe to produce a second electric signal indicative of the negative pressure;

a third detector for detecting pneumatic pressure to the second flow control means to produce a third electric signal indicative of the pneumatic pressure;

a speed signal generator for producing an electric binary signal indicative of the rotational speed of the engine in response to the first electric signal;

an analog-to-digital converter for converting the second electric signal into an electric binary signal indicative of the negative pressure;

a digital computer for repetitively calculating an optimum value indicative of optimum pneumatic pressure to be applied to the second flow control means in accordance with the binary signals, the computer being programmed to calculate the optimum value from a function describing a desired relationship among an optimum value, rotational speed of the engine and negative pressure in the induction pipe;

a digital-to-analog converter for converting an electric binary signal indicative of the calculated optimum value into an electric analog signal;

a drive circuit for selectively energizing the first and second electrically operated valves in response to an output signal therefrom, the drive circuit including means for comparing a level of the third electrical signal with first and second levels based on the electric analog signal to produce the output signal when the level of the third electric signal is out of a predetermined range defined by the first and second levels and to cease the output signal when the level of the third electric signal is in the predetermined range.

For actual practice of the present invention, first and second control valves are firstly provided within the recirculation pipe by the inventors and are operatively coupled to first and second servomotors respectively, the second control valve being located upstream of the first control valve. Thereafter, it has been experimentally observed by the inventors how the flow quantity of exhaust gases through the recirculation pipe can be controlled by cooperation of the control valves in accordance with changes of negative pressure in the first servomotor in relation to exhaust pressure appearing in the recirculation pipe between the control valves and changes of pneumatic pressure in the second servomotor in relation to the atmospheric pressure and negative pressure in the induction pipe.

As a result, the inventors have found that if the pneumatic pressure in the second servomotor satisfies the following function in relation to rotational speed of the engine and negative pressure in the induction pipe, the flow quantity of exhaust gases through the recirculation pipe may be precisely controlled in accordance with various changes of operative conditions of the engine.

$$Pd = f(Pv, N) \quad (1)$$

Where the character Pd indicates pneumatic pressure in the second servomotor, and where the characters Pv, N respectively indicate negative pressure in the induction pipe and rotational speed of the engine.

It has been also recognized that the above-noted function (1) will be experimentally obtained as a plurality of characteristic curves in relation to various types of engines. Prior to calculation of the pneumatic pressure Pd, for example, a plurality of values f(lΔPv, mΔN) may be obtained in the form of a map by division of the above-noted characteristic curves into a plurality of sections defined by predetermined values lΔP, mΔN (l, m=1, 2 ..., ΔP=25 mmHg, ΔN=200 r.p.m.). To calculate the pneumatic pressure Pd, the following inequalities and equations may be utilized in relation to respective values Pv, N, ΔPv, ΔN, the integers l, m, and the above-noted map.

$$lΔPv \leq Pv < (l+1)ΔPv \quad (2)$$

$$mΔN \leq N < (m+1)ΔN \quad (3)$$

$$Pd_1 = \frac{\{(l+1)ΔPv - Pv\}f(lΔPv, mΔN)}{ΔPv} + \frac{(Pv - lΔPv)f\{(l+1)ΔPv, mΔN\}}{ΔPv} \quad (4)$$

$$Pd_2 = \frac{\{(l+1)ΔPv - Pv\}f\{lΔPv, (m+1)ΔN\}}{ΔPv} + \frac{(Pv - lΔPv)f\{(l+1)ΔPv, (m+1)ΔN\}}{ΔPv} \quad (5)$$

$$Pd = \frac{\{(m+1)ΔN - N\}Pd_1 + (N - mΔN)Pd_2}{ΔN} \quad (6)$$

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
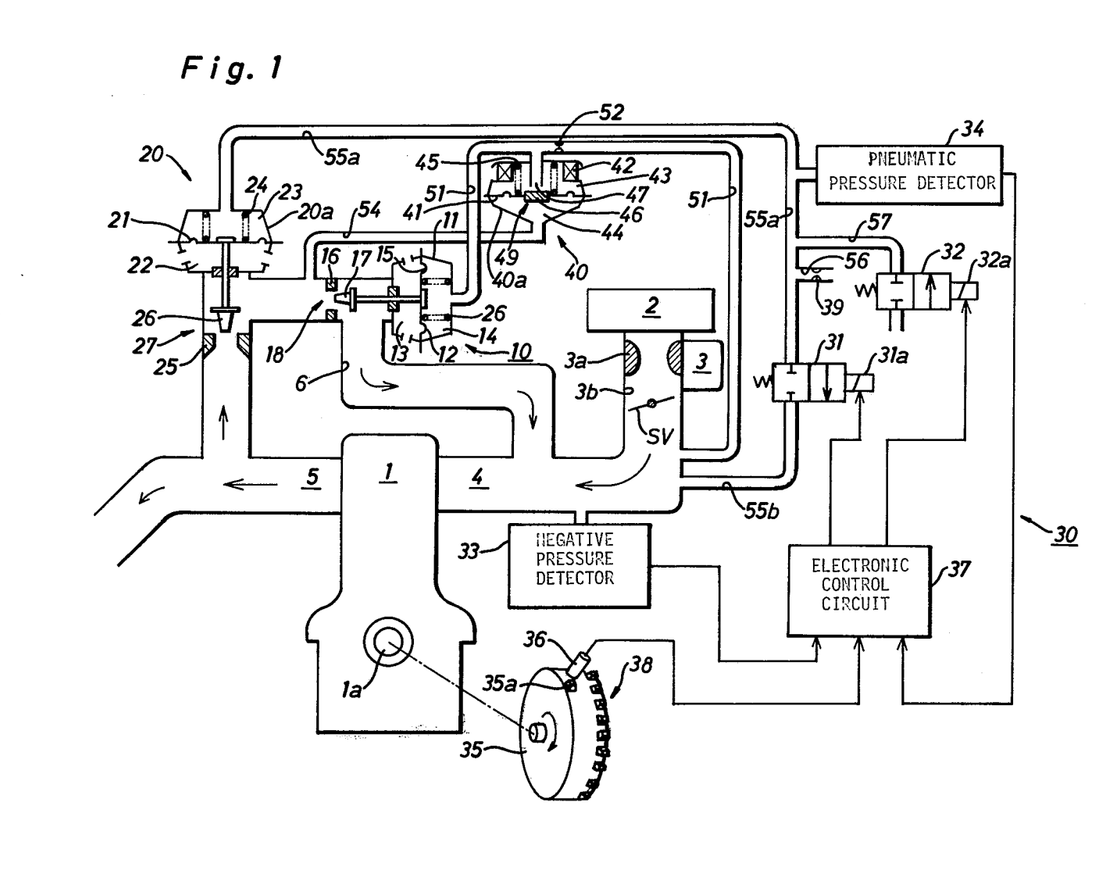
FIG. 1 is a schematic block diagram of an exhaust gas recirculation system for an internal combustion engine in accordance with the present invention.

Referring now to FIG. 1 of the drawings, there is schematically illustrated an exhaust gas recirculation system (hereinafter called an EGR system) for an internal combustion engine 1 in accordance with the present invention. The engine 1 is a conventional four cylinder, four stroke type and comprises intake and exhaust manifolds 4, 5. A carburetor 3 for engine 1 is also a conventional type and serves to reveive fresh air from an air filter 2 at upstream end of a barrel 3b. The fresh air is drawn into the barrel 3b and mixed with fuel at a venturi 3a. The air-fuel mixture is then sucked into a combustion chamber of engine 1 through a throttle valve SV and the intake manifold 4 and is discharged into the exhaust manifold 5 as exhaust gases. This exhaust gases produce exhaust pressure Pe in the exhaust manifold 5.

The EGR system comprises a recirculation pipe 6 which leads the exhaust manifold 5 to intake manifold 4 to recirculate the exhaust gases therethrough. The EGR system also comprises first and second servomotors 10, 20 respectively disposed within recirculation pipe 6, the first servomotor 10 being cooperable with a pressure regulator 40. The pressure regulator 40 includes a flexible diaphragm 41 assembled within a housing 40a to subdivide the interior of housing 40a into air and exhaust chambers 43, 44. The air chamber 43 is opened into the atmosphere through an air filter 42 and is also connected to intake manifold 4 through a conduit 51. An orifice 52 is provided within the conduit 51 between the pressure regulator 40 and intake manifold 4. The exhaust chamber 44 is connected through a conduit 54 to a portion of recirculation pipe 6 between the first and second servomotors 10, 20 to receive therein the exhaust pressure Ps from the portion of pipe 6. A compression spring 45 is disposed within the air chamber 43 to bias the diaphragm 41 toward the exhaust chamber 44. The pressure regulator 40 also comprises a regulator valve 49 provided within the air chamber 43. The regulator valve 49 has a valve body 46 cooperable with an open end 47 of conduit 51. The valve body 46 is secured to a central portion of diaphragm 41. When the exhaust pressure Ps in the exhaust chamber 44 is lower than a predetermined value, the regulator valve 49 is opened to reduce negative pressure within conduit 51. When the exhaust pressure Ps becomes higher than the predetermined value, the regulator valve 49 is closed to restrict the reduction of negative pressure within conduit 51. In this embodiment, the predetermined value of exhaust pressure Ps is determined to be apporoximately equal to the atmospheric pressure.

The first servomotor 10 includes a flexible diaphragm 12 assembled within a housing 11 to subdivide the interior of housing 11 into air and variable pressure chambers 13, 14. The air chamber 13 is opened into the atmosphere, and the variable pressure chamber 14 is connected to the intake manifold 4 through orifice 52 and conduit 51. A compression spring 15 is disposed within the variable pressure chamber 14 to bias the diaphragm 12 toward the air chamber 13. The servomotor 10 also includes a control valve 18 provided within the recirculation pipe 6. The control valve 18 has a valve body 17 which is cooperatble with a valve seat 16 to control a flow quantity of exhaust gases flowing through the valve seat 16 in accordance with a difference between negative pressure in pressure chamber 14 and biasing force of spring 15. The valve seat 16 is secured to an inner wall portion of pipe 6, and the valve body 17 is coupled to the diaphragm 12 through the air chamber 13.

The second servomotor 20 comprises flexible diaphragm 21 assembled within a housing 20a to subdivide the interior of housing 20a into air and servo chambers 22, 23, the air chamber 22 being opened into the atmosphere. A compression spring 24 is disposed within the servo chamber 23 to bias the diaphragm 21 toward the air chamber 22. The servomotor 20 also includes a control valve 27 provided within the recirculation pipe 6 at upstream of the control valve 18. The control valve 27 has a valve body 26 which is cooperable with a valve seat 25 to control the flow quantity of exhaust gases flowing through the valve seat 25 in accordance with a difference between pneumatic pressure within servo chamber 23 and biasing force of spring 24. In the embodiment, the control valve 27 fully closes when the pneumatic pressure in the servo chamber 23 is a value of −40 mmHg. The control valve 27 fully opens when the pneumatic pressure is a value of −160 mmHg, the atmospheric pressure being defined as 0 mmHg. The valve seat 25 is secured to an inner wall poriton of pipe 6, and the valve body 26 is coupled to the diaphragm 21 through the air chamber 22.

In this embodiment, the flow quantity of exhaust gases recirculated through pipe 6 under control by the control valves 18, 27 is represented as the following relationship.

$$Q = CA\sqrt{Pe - Ps}$$

Where the character Q indicates the flow quantity of exhaust gases recirculated through pipe 6, and where the character C indicates a coefficient of the flow quantity of the recirculated exhaust gases, and the character A indicates an opening degree of the control valve 27. Since the predetermined value of exhaust pressure Ps is determined to be approximately the atmospheric pressure, as previously described, it will be understood that the flow quantity Q of exhaust gases is approximately proportional to a quantity of air sucked into engine 1, taking account of a conventionally proportional relationship between the flow quantity of sucked air and the flow quantity of exhaust gases discharged into exhaust manifold 5.

The EGR system further comprises a pneumatic pressure control mechanism 30 in which an electronic control circuit 37 is provided to control operation of first and second electrically operated valves 31, 32 in response to electric signals from a negative pressure detector 33, a rotational speed detector 38 and a pneumatic pressure detector 34. The first electrically operated valve 31 is a normally closed type and connected at its inlet port to the servo chamber 23 of servomotor 20 through a conduit 55a. The valve 31 is also connected at its outlet port to the intake manifold 4 through conduit 55b. When the control circuit 37 produces a first output signal therefrom, as described below in deteil, the electrically operated valve 31 is opened to communicate the servo chamber 23 with the intake manifold 4 through conduits 55a, 55b. The second electrically operated valve 32 is also a normally closed type and is disposed within a bypass conduit 57. The bypass conduit 57 is opened at its one end into the atmosphere and is connected at its other end to the servo chamber 23 through conduit 55a. When the control circuit 37 produces a second output signal therefrom, as described below in detail, the electrically operated valve 32 is opened to communicate the servo chamber 23 of servomotor 20 with the atmosphere through conduits 55a, 57.

In the pressure control mechanism 30, an orifice 39 is disposed within another bypass conduit 56 of which both ends are respectively opened into the atmosphere and conduit 55a. Thus, air is continuously throttled and applied by orifice 39 to the servo chamber 23 of second servomotor 20 through the conduits 56, 55a regardlessly of operation of electrically operated valves 31, 32. In this embodiment, the orifice 39 serves to permit a quantity of air flowing therethrough with about 400 cc/min.

Figure 6:
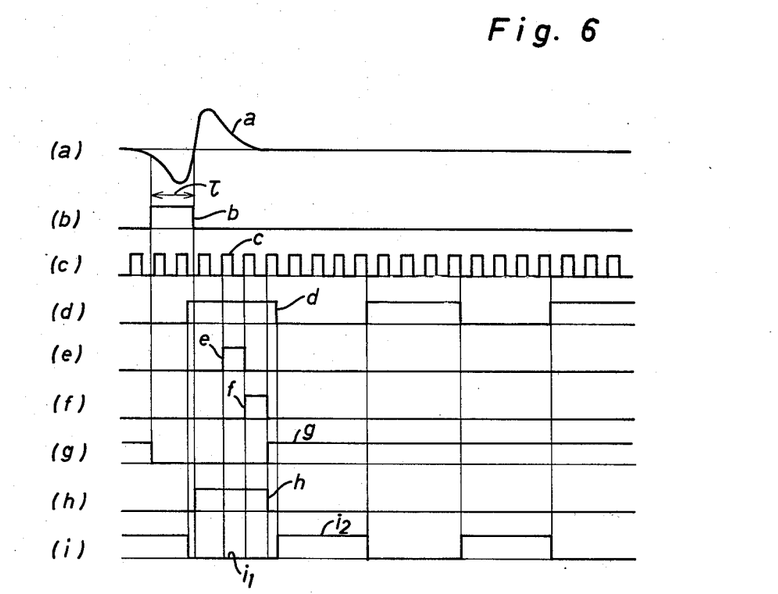
FIG. 6 illustrates waveforms obtained at various points in the circuit diagrams of FIGS. 2, 3.

The negative pressure detector 33 is provided on the intake manifold 4 to detect negative pressure Pv in the intake manifold 4, the detector 33 producing therefrom an electric signal indicative of the negative pressure Pv. The speed detector 38 includes a magnetic pickup transducer 36 which is located in magnetic coupling relationship with a projection 35a of a ring gear 35. The ring gear 35 is operatively connected to a crank shaft 1a of engine 1 to rotate once at one crank shaft rotation. When the crank shaft 1a rotates, the transducer 36 detects the angular position of the projection 35a at each rotation of ring gear 35 to produce therefrom an electric signal a indicative of rotational speed N of engine 1 (see FIG. 6). The pneumatic pressure detector 34 is provided on conduit 55a to detect pneumatic pressure in conduit 55a or servo chamber 23, the detector 34 producing an electric signal with a level Va corresponding to a reciprocal of an absolute value of the pneumatic pressure.

Figure 2:
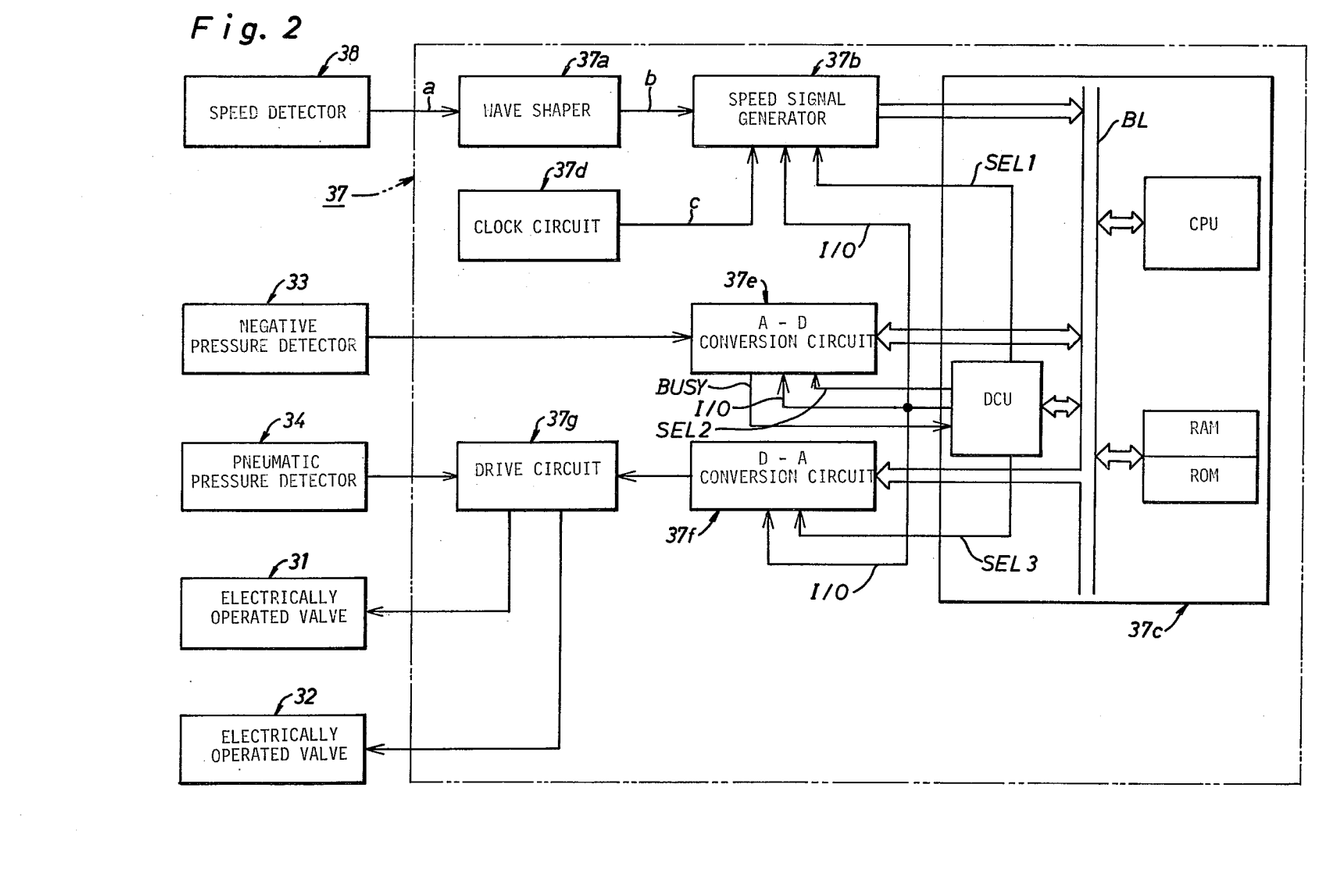
FIG. 2 is a circuit diagram of the electronic control circuit shown in block form in FIG. 1.

FIG. 2 illustrates a block diagram of the electronic control circuit 37 which comprises a speed signal generator 37b driven by a wave shaper 37a and a clock circuit 37d. The wave shaper 37a reshapes the electric signal a from speed detector 38 into a rectangular pulse signal b shown in FIG. 6. The pulse signal b has a pulse-width $\tau$ and a period of time T corresponding with rotational speed N of engine 1. The clock circuit 37d is a conventional crystal oscillator and serves to generate a series of clock pulses c (see FIG. 6) at a predetermined frequency (about 128 KHz). The speed signl generator 37b serves to calculate the period of time T of the pulse signal b in accordance with clock pulses c. Then, the calculated resultant value is latched in the signal generator 37b and applied as a binary signal through a bus line BL to a digital computer 37c in response to an input-output or I/O signal and a first device-select or SEL 1 signal from computer 37c, as described below in detail. In the electronic control circuit 37, an analog-to-digital conversion circuit 37e is provided to convert the electric signal from negative pressure detector 33 into an electric binary signal in response to the I/O signal, a second device-select or SEL 2 signal and an instruction signal from computer 37c. The binary signal from conversion circuit 37e is applied through bus line BL to computer 37c when required by computer 37c.

The digital computer 37c comprises a central processing unit or CPU which is connected by way of bus line BL to a read only memory or ROM, a random access memory or RAM, and a device control unit or DCU. A program is previously stored in ROM such that CPU calculates an optimum value indicative of optimum pneumatic pressure Pd from the above-noted inequalities (2), (3) and equations (4), (5), (6). ROM also stores therein the above-noted data indicative of a plurality of the values f(lΔPv, mΔN) in the form of the map. DCU serves to produce therefrom the I/O signal, SEL 1 and SEL 2 signals and a third device-select or SEL 3 signal when required by CPU. In accordance with proceeding of the program, the SEL 1 and I/O signals are applied to speed signal generator 37b, the SEL 2 and I/O signals are applied to the analog-to-digital conversion circuit 37e, and the SEL 3 and I/O signals are also applied to the digital-to-analog conversion circuit 37f.

RAM temporarily stores therein the binary signals from speed signal generator 37b and analog-to-digital conversion circuit 37e in response to the I/O, SEL 1 and SEL 2 signals. The optimum value indicative of optimum pneumatic pressure Pd is calculated in CPU by means of the program by using the binary signals from RAM. The calculated optimum value is applied as a binary signal to the digital-to-analog conversion circuit 37f in response to the I/O and SEL 3 signals. In practice of the present invention, a microcomputer of TLCS-12A type manufactured by TOKYO SHIBAURA ELECTRIC CO., LTD. in Japan has been used as computer 37c due to its commercial availability. Detail description regarding the microcomputer is eliminated because the particular construction and programming process is well known in prior arts.

The digital-to-analog conversion circuit 37f serves to convert the binary signal from computer 37c into an electric analog voltage in response to the I/O and SEL 3 sinals from computer 37c, the analog voltage being indicative of the calculated optimum value of the binary signal from computer 37c. A drive circuit 37g is provided to selectively produce the first and second output signals in response to the electric signal from the negative pressure detector 34 and the analog voltage from the converter 37f. The first and second output signals are respectively applied to the first and second electrically operated valves 31, 32.

Figure 3:
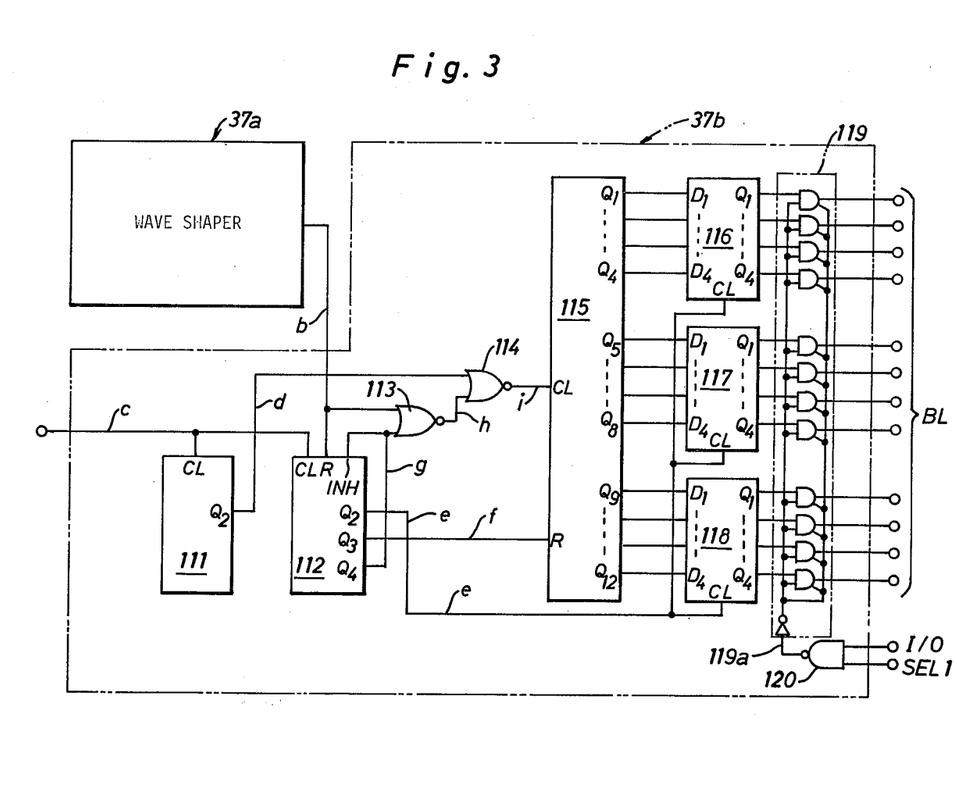
FIG. 3 is a circuit diagram of the speed signal generator shown in block form in FIG. 2.

In FIG. 3, there is illustrated a preferred embodiment of the speed signal generator 37b which comprises a binary counter 111 having a clock terminal CL for receiving clock pulses c from clock circuit 37d. The binary counter 111 is CD4024 type manufactured by RCA and serves to produce an electric signal d (see FIG. 6) at its output terminal $Q_2$ in accordance with clock pulses c, the electric signal d having a frequency of about 32 KHz. The electric signal d from counter 111 is applied to a NOR gate 114. The speed signal generator 37d also comprises a decade counter 112 which has a reset terminal R for receiving the pulse signal b from wave shaper 37a and a clock terminal CL for receiving clock pulses c from clock circuit 37d. When the decade counter 112 is reset in response to the pulse signal b, it starts to count clock pulses c at a trailing edge of the pulse signal b. Then, the counter 112 produces electric signals e, f, g at respective output terminals $Q_2$, $Q_3$, $Q_4$ in sequence. The electric signal e is applied to shift registers 116, 117, 118, the electric signal f is applied to a binary counter 115, and the electric signal g is applied to a NOR gate 113. The electric signal g is also applied to an inhibit terminal 1NH of counter 112 to inhibit counting operation in counter 112.

NOR gare 113 has input terminals for respectively receiving the pulse signal b from wave shaper 37a and the electric signal g from counter 112. When the signals b, g are a low level respectively, NOR gate 113 produces a high level signal h (see FIG. 6) therefrom. When one of the signals b, g becomes a high level, the high level signal h becomes a low level. NOR gare 114 has input terminals for respectively receiving the electric signal d from counter 111 and the high level signal h from NOR gate 113. When the electric signal d is a high level, NOR gate 114 produces a low level signal $i_1$ therefrom (see FIG. 6). When the electric signal d becomes a low level, NOR gate 114 produces a high level signal $i_2$ therefrom. The low and high level signals $i_1$, $i_2$ are alternatively applied to a clock terminal CL of counter 115.

The binary counter 115 is reset in response to the electric signal f from counter 112 and starts to count a series of high level signals $i_2$ at a trailing edge of the electric signal f. The counting operation in counter 115 is completed at a trailing edge of an electric pulse signal b which will be produced from wave shaper 37a after generation of the above-noted signal f. In other words, the counting operation in counter 115 is started at the trailing edge of the above-noted signal f and thereafter completed at a leading edge of a high level signal h which will be produced from NOR gate 113 after generation of the above-noted signal f. As a result, the counter 115 produces respective output signals at its terminals $Q_1$ to $Q_{12}$ as an electric binary signal indicative of the period of time T of the pulse signal b, the period of time T being proportional to a reciprocal of rotational speed N of engine 1.

The shift registers 116, 117, 118 are respectively of CD 4035 type manufactured by RCA. The shift register 116 has a clock terminal CL for receiving the electric signal e from counter 112 and input terminals $D_1$ to $D_4$ for respectively receiving the output signals from the terminals $Q_1$ to $Q_4$ of counter 115. When the electric signal e appears from counter 112, the register 116 latches therein the output signals from counter 115. The remaining registers 117, 118 have substantially the same construction and function as those of register 116. Thus, all the output signals from counter 115 are simultaneously latched as the binary signal by the registres 116, 117, 118.

The speed signal generator 37b comprises a three-state-buffer 119 controlled by a NAND gate 120. NAND gate 120 has input terminals for respectively receiving the I/O and SEL 1 signals from computer 37c. When the I/O and SEL 1 signals are a high level respectively, NAND gate 120 produces a low level signal therefrom. When one of the I/O and SEL 1 signals becomes a low level, NAND gate 120 produces a high level signal therefrom. The three-state-buffer 119 has a control terminal 119a for receiving the low or high level signal from NAND gate 120 and input terminals for respectively receiving the output signals from registers 116, 117, 118. The three-state-buffer 119 transfers the output signals from registers 116, 117, 118 as the binary signal into computer 37c through bus line BL in response to the low level signal from NAND gate 120. When NAND gate 120 produces the high level signal, high impedance is formed at output terminals of three-state-buffer 119 to electrically disconnect the computer 37c from the registers 116, 117, 118.

Figure 4:
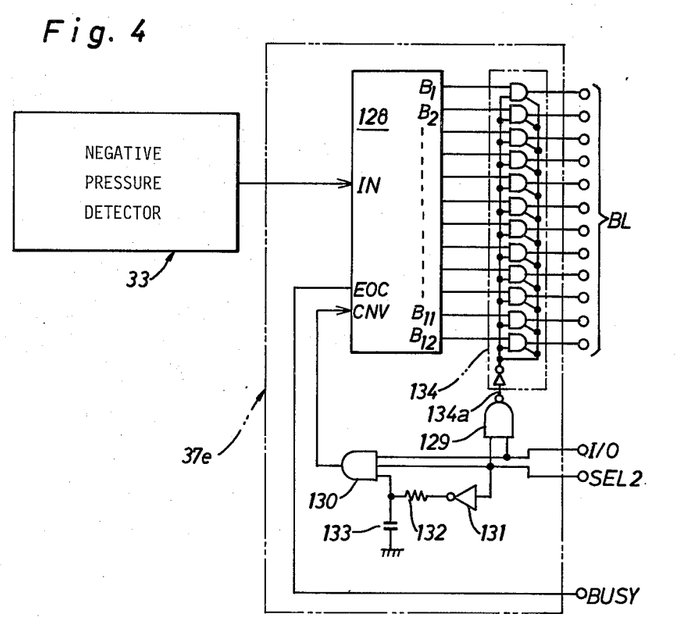
FIG. 4 is a circuit diagram of the analog-to-digital conversion circuit shown in block form in FIG. 2.
Figure 7:
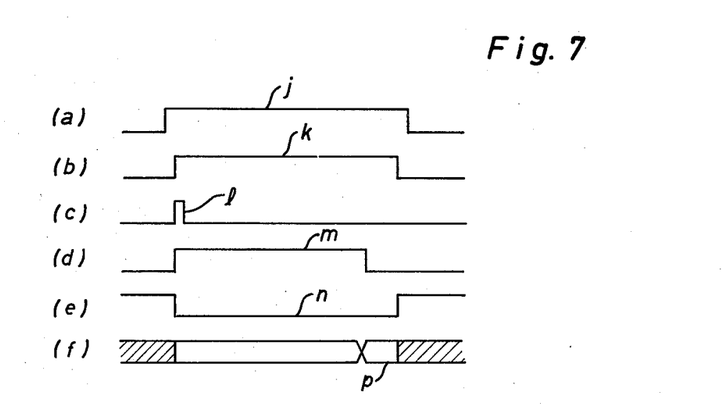
FIG. 7 illustrates waveforms obtained at various points in the circuit diagram of FIG. 4.

FIG. 4 illustrates a preferred embodiment of the analog-to-digital conversion circuit 37e which includes a successive approximation analog-tp-digital converter 128 controlled by an AND gate 130 and a three-state-buffer 134 controlled by a NAND gate 129. NAND gate 129 has input terminals for respectively receiving the I/O and SEL 2 signals from computer 37c. When the I/O and SEL 2 signals are respectively high level signals j, k (see FIG. 7), NAND gate 129 produces therefrom a low level signal n (see FIG. 7). When one of the I/O and SEL 2 signals becomes a low level, the low level signal n from NAND gate 129 becomes a high level. AND gate 130 has first and second input terminals for respectively receiving the I/O and SEL 2 signals from computer 37c. AND gate 130 also has a third input terminal for receiving the SEL 2 signal through a delay circuit including an inverter 131, a resistor 132 and a condenser 133. When the I/O and SEL 2 signals are respectively the high level signals j, k, AND gate 130 produces therefrom an electric pulse signal l having a pulse-width of about 100 nanoseconds (see FIG. 7).

The analog-to-digital converter 128 is of ADC 80AG-12 type manufactured by Burr-brown research corporation in U.S.A. The converter 128 has an input terminal IN for receiving the electric signal from negative pressure detector 33 and a convert-command input terminal CNV for receiving the pulse signal 1 from AND gate 130. The converter 128 also has an end-of-conversion output terminal EOC for applying an electric signal to computer 37c. When AND gate 130 produces the pulse signal 1 therefrom, the converter 128 initiates to convert the electric signal from detector 33 into a binary signal at a leading edge of the pulse signal 1. Simultaneously, the electric signal is produced from the output terminal EOC of converter 128 as a high level or busy signal m (see FIG. 7) and applied to DCU of computer 37c. In this instance, during generation of the busy signal m, the above-noted conversion in converter 128 is continued, and transfer of the binary signal from converter 128 to computer 37c through three-state-buffer 134 is conditioned in waiting. When the busy signal m becomes a low level, the above-noted conversion in converter 128 is ended, and the above-noted waiting condition of transfer of the binary signal from converter 128 is also released. Thus, the binary signal from converter 128 is transferred to computer 37c in accordance with the low level signal n from NAND gate 129 within a period of time shown by the character p in FIG. 7. When the high level signal k becomes a low level (see FIG. 7), high impedance is formed in three-state-buffer 134 in response to the high level signal from NAND gate 129 to electrically disconnect the computer 37c from the converter 128. In addition, the three-state-buffer 134 has the same construction and function as that in the speed signal generator 37b of FIG. 3.

Figure 5:
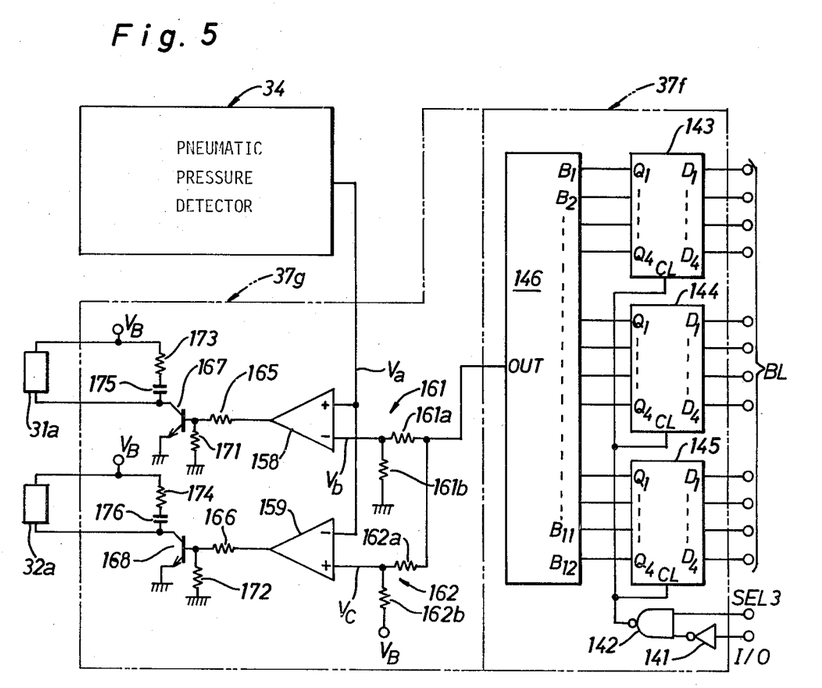
FIG. 5 is circuit diagrams of the digital-to-analog conversion circuit and drive circuit respectively shown in block forms in FIG. 2.

FIG. 5 illustrates preferred embodiments of the digital-to-analog conversion circuit 37f and drive circuit 37g. The digital-to-analog conversion circuit 37f comprises shift registers 143, 144, 145 controlled by a NAND gate 142. NAND gate 142 has a first input terminal for receiving the SEL 3 signal from computer 37c and a second input terminal for receiving an inverted output signal form an inverter 141. The inverter 141 serves to invert the I/O signal from computer 37c into the inverted output signal. When the SEL 3 and inverted output signal are respectively a high level, NAND gate 142 produces a low level or latch signal therefrom. Each of shift registers 143, 144, 145 is the same as each of the registers 116, 117, 118 shown in FIG. 3 and is provided with a clock terminal CL for receiving the latch signal from NAND gate 142. The binary signal from computer 37c is latched by the registers 143, 144, 145 in response to the latch signal from NAND gate 142 and transferred to a digital-to-analog converter 146. The converter 146 is of DAC 80 type manufactured by Burr-brown reserch corporation and converts the latched binary signal from registers 143, 144, 145 into an electric analog voltage indicative of the optimam pneumatic pressure Pd defined by the binary signal from computer 37c.

The drive circuit 37g comprises a first voltage divider 161 having a pair of resistors 161a, 161b, and a first comparator 158 controlled by the pneumatic pressure detector 34 and first voltage divider 161. In the voltage divider 161, the resistor 161b is grounded at its one end and connected at its other end to the output terminal of digital-to-analog converter 146 through the resistor 161a. When the converter 146 produces the analog voltage therefrom, the voltage divider 161 generates therefrom a divided voltage $V_b$ in response to the analog voltage. The first comparator 158 has a first input terminal for receiving the electric signal from the pneumatic pressure detector 34 and a second input terminal for receiving the divided voltage $V_b$ from the voltage divider 161. When the level $V_a$ of the electric signal from detector 34 is higher than the divided voltage $V_b$ from divider 161, the comparator 158 produces a high level signal therefrom. When the level $V_a$ of the electric signal is lower than the divided voltage $V_b$, the comparator produces a low level signal therefrom. The low or high level signal from comparator 158 is applied to a base of a power transistor 167 through input and bias resistors 165, 171. The collector of power transistor 167 is connected to an electric source $V_B$ through an electromagnetic coil 31a of the valve 31, the coil 31a being connected in parallel to a resistor 173 and a condenser 175. When the transistor 167 is turned on in response to the high level signal from comparator 158 to produce the first output signal therefrom, the coil 31a is energized to open the valve 31. The transistor 167 is also turned off in response to the low level signal from comparator 158 such that the coil 31a is deenergized to close the valve 31.

The drive circuit 37g further comprises a second voltage divider 162 havnig a pair of resistors 162a, 162b, and a second comparator 159 controlled by the pneumatic pressure detector 34 and second voltage divider 162. In the voltage divider 162, the resistor 162b is connected at its one end to the electric soure $V_B$ and is connected at its other end to the output terminal of converter 146 through the resistor 162a. Thus, a difference between the analog voltage from converter 146 and an electric voltage from source $V_B$ is divided by the voltage divider 162 and produced as a divided voltage $V_c$ indicative of pneumatic pressure Po (see FIG. 8) from divider 162.

Figure 8:
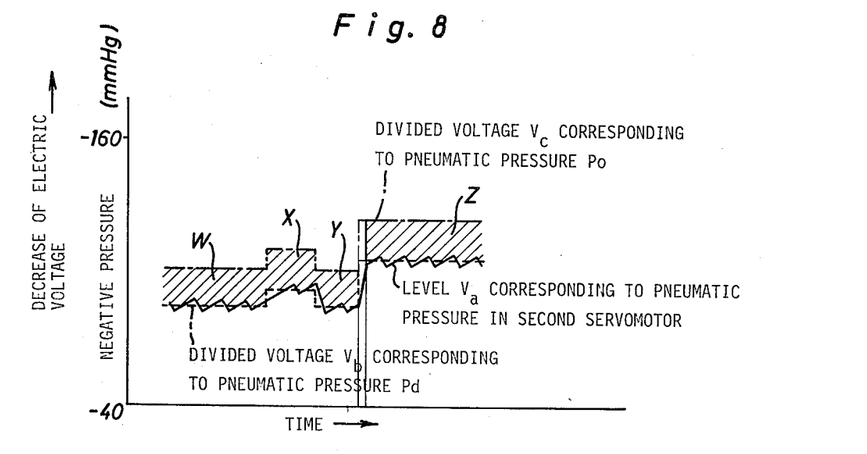
FIG. 8 is a graph showing negative pressure or electric voltage in relation to time.

The second comparator 159 has a first input terminal for receiving the electric signal from pneumatic pressure detector 34 and a second input terminal for receiving the devided voltage $V_c$ from the voltage divider 162. When the level $V_a$ of the electric signal from detector 34 is higher than the divided voltage $V_c$ from divider 162, the comparator 159 produces a low level signal therefrom. When the level $V_a$ of the electric signal is lower than the divided voltage $V_c$, the comparator 159 produces a high level signal therefrom. The low or high level signal from comparator 159 is applied to a base of a power transistor 168 through input and bias resistors 166, 172. The collector of power transistor 168 is connected to the electric source $V_B$ trhough an electromagnetic coil 32a of the valve 31, the coil 32a being connected in parallel to a resistor 174 and a condenser 176. When the transistor 168 is turned on in response to the high level signal from comparator 159 to produce the second output signal therefrom, the coil 32a is energized to open the valve 32. The transistor 168 is also turned off in response to the low level signal from comparator 159 such that the coil 32a is deenergized to close the valve 32. In operational relationship between the drive circuit 37g and electrically operated valves 31, 32, the divided voltage $V_c$ from the second voltage divider 162 is determined to be lower than the divided voltage $V_b$ from the first voltage divider 161 by a predetermined value corresponding with, for instance, 10 mmHg, as shown in FIG. 8. Thus, the valves 31, 32 are respectively maintained under closure within an area formed between the divided voltages $V_b$, $V_c$.

OPERATION

Assuming that during rotation of engine 1, the second servomotor 20 of the EGR system is maintained in operative condition defined by a first area W shown in FIG. 8, exhaust gases discharged into exhaust manifold 5 are recirculated under control by the control valves 27, 18 into the intake manifold 4 through recirculation pipe 6.

Under this condition, exhaust pressure produced in recirculation pipe 6 between control valves 27, 18 is applied to exhaust chamber 44 of pressure regulator 40 through conduit 54. Negative pressure from intake manifold 4 is then regulated within the conduit 51 by regulator valve 49 in relation to the atomospheric pressure in the air chamber 43 and is applied to the variable pressure chamber 14 of first servomotor 10 as regulated negative pressure. Thus, an opening degree of control valve 18 is substantially maintained in a valve in accordance with the regulated negative pressure in the variable pressure chamber 14.

Furthermore, in the pneumatic pressure control mechanism 30, rotational speed N of engine 1 is detected and produced by speed detector 38 as an electric signal a indicative of the rotational speed N. Negative pressure Pv in the intake manifold 4 is detected and produced by negative pressure detector 33 as an electric signal indicative of the negative pressure Pv, and pneumatic pressure in the servo chamber 23 of second servomotor 20 is also detected and produced by pneumatic pressure detector 34 as an electric signal with a level $V_a$ corresponding to a reciprocal of an absolute value of the pneumatic pressure. The electric signals from detectors 38, 33, 34 are respectively applied to wave shaper 37a, analog-to-digital conversion circuit 37e and drive circuit 37g.

The electric signal a is then reshaped by wave shaper 37a and applied to speed signal generator 37b as a rectangular pulse signal b together with clock pulses c from clock circuit 37d. In the speed signal generator 37b, clock pulses c are counted and produced by the binary counter 111 as an electric signal d which is applied to NOR gate 114. When the decade counter 112 is reset in response to the pulse signal b from wave shaper 37a, clock pulses c are counted and produced by counter 112 as electric signals e, f, g in sequence, as previously described. The electric signals e, f are respectively applied to the shift registers 116, 117, 118 and binary counter 115, and the electric signal g is also applied to NOR gate 113 and counter 112.

Then, an electric binary signal indicative of a period of time T, which has been previously produced from counter 115, is latched by the shift registers 116, 117, 118 in response to the electric signal e from counter 112. When NAND gate 120 produces therefrom a low level signal, as previously described, the latched binary signal in registers 116, 117, 118 is transferred by three-state-buffer 119 to computer 37c through bus line BL to be temporarily memorized in RAM. A sereis of high level signals $i_2$, which will be sequentially produced from NOR gate 114, are also counted by the binary counter 115 in response to the electric signal f from counter 112, counting operation of counter 112 being inhibited in response to the electric signal g.

When NAND gate 129 and AND gate 130 in the analog-to-digital conversion circuit 37e produce a high level signal and an electric pulse signal l respectively, as previously described, the successive approximation analog-to-digital converter 128 is eltrically disconnected from computer 37c by the three-state-buffer 134 and initiates to convert the electric signal indicative of the negative pressure Pv from negative pressure detector 33 into a binary signal. Simultaneously, a high level signal m is produced and applied by the converter 128 to computer 37c as busy signal. Then, transfer of the binary signal from converter 128 to computer 37c is conditioned in waiting. When the busy signal becomes a low level, the above-noted conversion in converter 128 is ended, and the above-noted waiting condition of computer 37c is released. The high level signal from NAND gate 129 also becomes a low level signal n, as previously described, which is applied to the three-state-buffer 134. Thus, the binary signal from converter 128 is transferred into computer 37c by the three-state-buffer 134 to be temporarily memorized in RAM.

When the binary signals from the speed signal generator 37b and analog-to-digital conversion circuit 37e are memorized in RAM, as previously described, the binary signal indicative of the period of time T is firstly read out by CPU by means of the computer program. Then, a reciprocal of the period of time T is calculated in CPU and memorized temporarily in RAM as rotational speed N. In accordance with proceeding of the computer program, the binary signal indicative of the negative pressure Pv is read out from RAM together with the rotational speed N, and values of the integers l, m are respectively determined by CPU from the programmed inequalities (2), (3) in relation to the values N, Pv. Thereafter, respective values $f(l\Delta Pv, m\Delta N)$, $f\{(l+1)\Delta Pv, m\Delta N\}$, $f\{l\Delta Pv, (m+1)\Delta N\}$, $f\{(l+1)\Delta Pv, (m+1)\Delta N\}$ are read out from ROM by CPU in relation to the determined values of the integers l, m. Thus, an optimum value indicative of optimum pneumatic pressure Pd is calculated in CPU by using the respective values Pv, N, l, m, $\Delta Pv$, $\Delta N$ from the programmed equations (4), (5), (6) and, in turn, transferred as a binary signal to the digital-to-analog conversion circuit 37f in response to the I/O and SEL 3 signals.

When NAND gate 142 in the digital-to-analog conversion circuit 37f produces a latch signal therefrom, as previously described, the binary signal from computer 37c is transferred by the shift registers 143, 144, 145 into the digital-to-analog converter 146. Then, the binary signal is converted and applied by converter 146 to the drive circuit 37g as an electric analog voltage. The analog voltage from the converter 146 is then divided and applied by the first voltage divider 161 to the first comparator 158 as a divided voltage $V_b$ together with the above-mentioned electric signal from the pneumatic pressure detector 34. The analog voltage from the converter 146 is also divided and applied by the second voltage divider 162 to the second comparator 159 as a divided voltage $V_c$ together with the above-mentioned electric signal from detector 34.

In this instance, the level $V_a$ of the electric signal from detector 34 is maintained to be slightly lower or higher than the divided voltage $V_b$ in relation to operation of the orifice 39, since the operative condition of servomotor 20 is maintained in the first area W of FIG. 8, as previously described. Low and high level signals are, therefore, alternatively produced and applied by the first comparator 158 to transistor 167 so that the electromagnetic coil 31a is energized in response to intermittent conduction of transistor 167 to open the first electrically operated valve 31 intermittently. Since the level $V_a$ of the electric signal from detector 34 is also maintained to be higher than the divided voltage $V_c$, as clearly understood from the above, a low level signal is produced and applied by the second comparator 159 to transistor 168 so that the electromagnetic coil 32a is deenergized due to nonconduction of transistor 168 to close the second electrically operated valve 32 continuously.

Thus, negative pressure is intermittently applied from intake manifold 4 to the servo chamber 23 of second servomotor 20 through the conduit 55b, electrically operated valve 31 and conduit 55a, and the atmospheric pressure is also continuously throttled and applied by orifice 39 to the servo chamber 23 through the conduits 56, 55a. As a result, pneumatic pressure in the servo chamber 23 of second servomotor 20 is substantially modulated in the optimum value to maintain an opening degree of control valve 27 in a value. In this instance, due to control by orifice 39, the pneumatic pressure in the servo chamber 23 is well precisely modulated toward the optimum value, and operational frequency of the electrically operated valve 31 is decreased to hold life of valve 31 as long as possible. As clearly understood from the above description, the flow quantity of exhaust gases recirculated through the recirculation pipe 6 are precisely controlled by cooperation between the control valves 18, 27 to ensure good driveability of a vehicle and proper fuel consumption.

Even if operative condition of servomotor 20 is shifted from the first area W to second and third areas X, Y in sequence, as shown in FIG. 8, it will be clearly understood that the same operation as the above-noted operation is substantially maintained in the areas X, Y, since each of divided voltages $V_b$ in the areas X, Y does not change beyond difference between divided voltages $V_b$, $V_c$.

When operative condition of the servomotor 20 is shifted from the third area Y to a fourth area Z in accordance with changes of engine rotation, as shown in FIG. 8, negative pressure in the variable pressure chamber 14 of first servomotor 10 is regulated by pressure regulator 40 in accordance with changes of exhaust pressure in recirculation pipe 6 and negative pressure in intake manifold 4. Thus, the opening degree of control valve 18 is changed in accordance with changes of the negative pressure in the variable pressure chamber 14.

In the pneumatic pressure control mechanism 30, changes of the engine rotation are detected and produced by speed detector 38 as an electric signal a, and changes of negative pressure in intake manifold 4 are detected and produced by negative pressure detector 33 as an electric signal. In this instance, the pneumatic pressure in the servo chamber 23 of servomotor 20 may be substantially held in a value defined by the third area Y. When the electric signal a is reshaped by wave shaper 37a, it is applied to speed signal generator 37b as a rectangular pulse signal b together with clock pulses c from clock circuit 37d. Then, an electric binary signal is produced and applied by speed signal generator 37b to computer 37c to be temporarily memorized in RAM, as previously described. The electric signal from negative pressure detector 33 is also converted and applied by analog-to-digital conversion circuit 37e to computer 37c as an electric binary signal to be temporarily memorized in RAM, as previously described.

Then, an optimum value indicative of optimum pneumatic pressure is calculated in computer 37c by means of the program in accordance with the binary signals from the speed signal generator 37b and analog-to-digital conversion circuit 37e and, in turn, transferred as a binary signal to the digital-to-analog conversion circuit 37f, as previously described. When the binary signal from computer 37c is converted by convertion circuit 37e into an electric analog voltage, the analog voltage is divided by the first and second voltage dividers 161, 162 respectively into divided voltages $V_b$, $V_c$.

When the first comparator 158 receives the divided voltage $V_b$ together with the electric signal from pneumatic pressure detector 34, a high level signal is produced from first comparator 158, since the level $V_a$ of the electric signal (see the area Y of FIG. 8) is higher than the divided voltage $V_b$ shown by the area Z of FIG. 8. The high level signal from first comparator 158 is applied to transistor 167 so that the electromagnetic coil 31a is energized due to conduction of transistor 167 to open the first electrically operated valve 31. Although the second comparator 159 receives the divided voltage $V_c$ together with the electric signal from detector 34, the low level signal is continuously produced from second comparator 159, since the level $V_a$ of the electric signal is still higher than the divided voltage $V_c$. This means that closure of the second electrically operated valve 32 is still maintained.

Negative pressure is then applied from intake manifold 4 to the servo chamber 23 of second servomotor 20 through the electrically operated valve 31 to modulate pneumatic pressure in the servo chamber 23. When the pneumatic pressure in the servo chamber 23 reaches the optimum value calculated in computer 37c, the level $V_a$ of the electric signal from sensor 34 becomes the divided voltage $V_b$ in the fourth area Z, and the first comparator 158 produces therefrom a low level signal to make the transistor 167 nonconductive. Thus, the electromagnetic coil 31a is deenergized due to nonconduction of transistor 167 to close the electrically operated valve 31.

Thereafter, the level $V_a$ of the electric signal from detector 34 is maintained to be slightly lower or higher than the divided voltage $V_b$ in relation to operation of the orifice 39, as shown in the area Z of FIG. 8. As a result, the opening degree of control valve 27 is changed and maintained in accordance with the modulated pneumatic pressure in the servo chamber 23, as previously described. From the above description, it will be understood that under the fource area Z, the flow quantity of exhaust gases recirculated through the recirculation pipe 6 are precisely controlled by cooperation between the control valves 18, 27 to ensure good driveability of the vehicle and proper fuel consumption.

Figure 9:
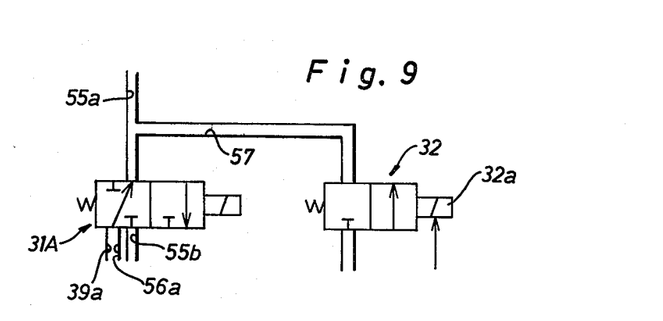
FIG. 9 is a partial modification of the pneumatic pressure control mechanism shown in FIG. 1.

FIG. 9 illustrates a partial modification of the pneumatic pressure control mechanism 30 in which an electrically two-way operated valve 31A is adapted in replacement of the electrically operated valve 31 of the previous embodiment. In the modification, the conduit 56 and orifice 39 of the previous embodiment are replaced with a conduit 56a and an orifice 39a. The conduit 56a is connected at its one end to an inlet port of the valve 31A and opened at its other end into the atmosphere. Under deactivation of the valve 31A, the conduit 55a is communicated with the conduit 56a and isolated from conduit 55b. Upon activation of the valve 31A, the conduit 55a is isolated from the conduit 56a and communicated with the conduit 55b.

Figure 10:
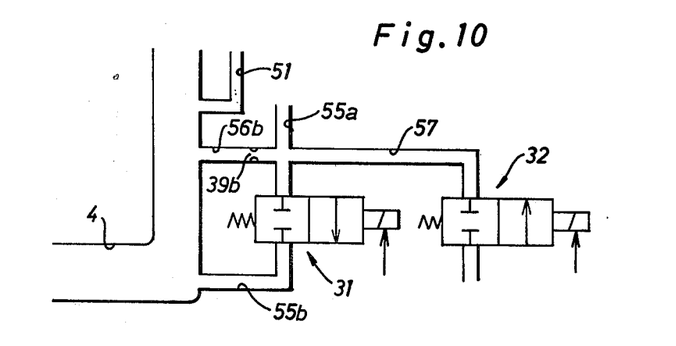
FIG. 10 is another partial modification of the control mechanism in FIG. 1.
Figure 11:
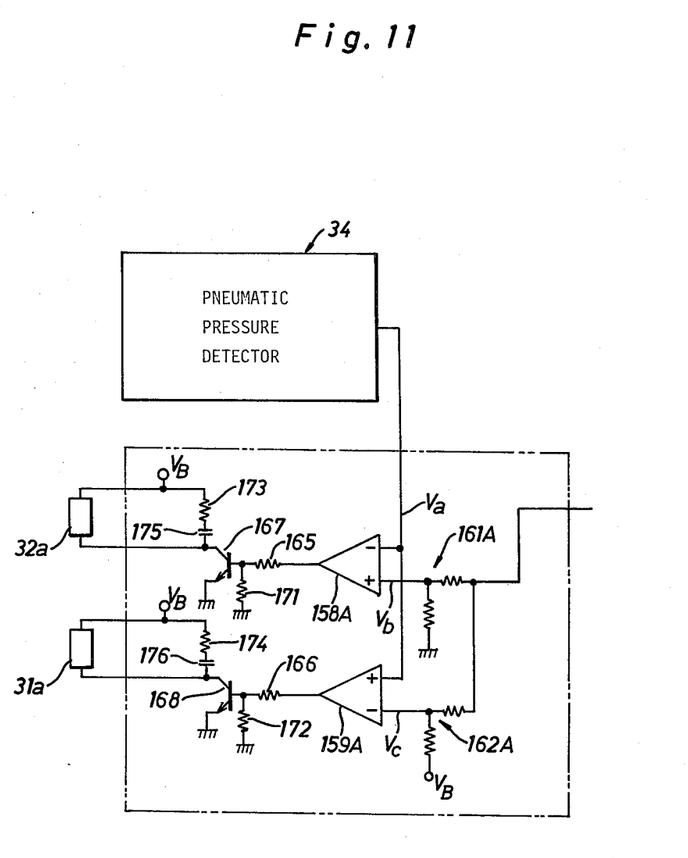
FIG. 11 is a modification of the drive circuit shown in block form in FIG. 2.

FIG. 10 illustrates another partial modification of the pneumatic pressure control mechanism 30, in which a conduit 56b and an orifice 39b are adapted in replacement of the above-noted circuit 56 and orifice 39. Both ends of the conduit 56b are connected with the intake manifold 4 and conduit 55a respectively. In the modification, a drive circuit shown in FIG. 11 is adapted in replacement of the above-noted drive circuit 37g. The drive circuit is characterized in that voltage dividers 161A, 162A are respectively adapted in replacement of the above-noted first and second voltage dividers 161, 162, comparators 158A, 159A are respectively adapted in replacement of the above-noted comparators 158, 159, and the electromagnetic coils 32a, 31a of second and first electrically operated valves 32, 31 are respectively connected to the power transistors 167, 168.

When the level $V_a$ of the electric signal from pneumatic pressure detector 34 is lower than a divided voltage $V_b$ issued from voltage divider 161A, the comparator 158A produces a high level signal therefrom. When the level $V_a$ of the electric signal is higher than the divided voltage $V_b$ from divider 161A, the comparator 158A produces a low level signal therefrom. The low or high level signal from comparator 158A is applied to the base of transistor 167 through resistors 165, 171. The transistor 167 is turned on in response to the high level signal from comparator 158A such that the electromagnetic coil 32a is energized to open the valve 32. The transistor 167 is also turned off in response to the low level signal from comparator 158A such that the coil 32a is deenergized to close the valve 32.

When the level $V_a$ of the electric signal from detector 34 is lower than a divided voltage $V_c$ issued from voltage divider 162A, the comparator 159A produces a low level signal therefrom. When the level $V_a$ of the electric signal is higher than the divided voltage $V_c$ from divider 162A, the comparator 159A produces a high level signal therefrom. The low or high level signal from comparator 159A is applied to the base of transistor 168 through resistors 166, 172. The transistor 168 is turned on in response to the high level signal from comparator 159A such that the electromagnetic coil 31a is energized to open the valve 31. The transistor 168 is also turned off in response to the low level signal from comparator 159A such that the coil 31a is deenergized to close the valve 31. In operational relationship between the electrically operated valves 31, 32 and the drive circuit of the modification, the divided voltage $V_c$ from the voltage divider 162A is determined to be higher than the divided voltage $V_b$ from the voltage divider 161A by a predetermined value. Thus, the valves 31, 32 are respectively maintained under closure within an area formed between the divided voltages $V_b$, $V_c$.

From the above description, it will be clearly understood that operation of the modification is characterized in that pneumatic pressure in the servo chamber 23 of second servomotor 20 is substantially maintained in a value by the second electrically operated valve 32 under control of the orifice 39b in accordance with changes of operative conditions of engine 1.

Although in the above embodiment the pneumatic pressure detector 34 is provided to detect pneumatic pressure in the servo chamber 23 of servomotor 20, it may be replaced with a differential transformer, a potentiometer and the like. In this case, the transformer or potentiometer may be operatively coupled to the diaphragm 21 of servomotor 20 to detect displacement of the diaphragm 21.

For practice of the present invention, it is possible that the same function as that of the drive circuit 37g may be substantially performed in the digital computer 37c to eliminate the drive circuit 37g.

What is claimed is:

1. In an exhaust gas recirculation system for an internal combustion engine having an induction pipe for conducting air-fuel mixture into a combustion chamber of said engine and an exhaust pipe for discharging exhaust gases from the combustion chamber therethrough, said system comprising:
a recirculation pipe leading said exhaust pipe to said induction pipe to recirculate exhaust gases into the combustion chamber of said engine therethrough;
first flow control means for controlling the flow quantity of exhaust gases through said recirculation pipe in accordance with changes of negative pressure applied thereto from said induction pipe in relation to exhaust pressure value appearing in said recirculation pipe at the upstream of said first flow control means; and
second flow control means for controlling the flow quantity of exhaust gases through said recirculation pipe in accordance with pneumatic pressure applied thereto, said second flow control means including first and second electrically operated valves to be selectively energized to apply the negative pressure and the atmospheric pressure respectively from said induction pipe and the exterior to said second flow control means to control the said pneumatic pressure;
an electric control apparatus for said system comprising:
a first detector for detecting rotational speed of said engine to produce a first electric signal indicative of the rotational speed of said engine;
a second detector for detecting negative pressure in said induction pipe to produce a second electric signal indicative of the negative pressure;
a third detector for detecting pneumatic pressure to said second flow control means to produce a third electric signal indicative of the pneumatic pressure;
a speed signal generator for producing an electric binary signal indicative of the rotational speed of said engine in response to the first electric signal;
an analog-to-digital converter for converting the second electric signal into an electric binary signal indicative of the negative pressure;
a digital computer for repetitively calculating an optimum value indicative of optimum pneumatic pressure to be applied to said second flow control means in accordance with the binary signals, said computer being programmed to calculate the optimum value from a function describing a desired relationship among an optimum value, rotational speed of said engine and negative pressure in said induction pipe;
a digital-to-analog converter for converting an electric binary signal indicative of the calculated optimum value into an electric analog signal;
a drive circuit for selectively energizing said first and second electrically operated valves in response to an output signal therefrom, said drive circuit including means for comparing a level of the third electric signal with first and second levels based on the electric analog signal to produce the output signal when the level of the third electric signal is out of a predetermined range defined by said first and second levels and to cease the output signal when the level of the third electric signal is in said predetermined range.

2. An exhaust gas recirculation system as claimed in claim 1, wherein said first electrically operated valve is disposed within a conduit connected between said induction pipe and said second flow control means; and further comprising an orifice disposed within a bypass conduit connecting the exterior to a portion of said conduit between said first electrically operated valve and said second flow control means, said orifice serving to throttle the flow quantity of pneumatic fluid from the exterior therethrough.

3. An exhaust gas recirculation system as claimed in claim 1, wherein said second electrically operated valve is disposed within a conduit connected between the exterior and said second flow control means; and further comprising an orifice disposed within a bypass conduit connecting said induction pipe to a portion of said conduit between said second electrically operated valve and said second flow control means, said orifice serving to throttle the flow quantity of pneumatic fluid to said induction pipe therethrough.

4. An exhaust gas recirculation system as claimed in claim 2, wherein said drive circuit includes a first voltage divider for producing a first divided voltage in accordance with the electric analog signal; and a second voltage divider for producing a second divided voltage in accordance with the electric analog signal, the second divided voltage being lower than the first divided voltage by a predetermined value to define said predetermined range; and wherein said means includes a first comparator connected to said first electrically operated valve for comparing the level of the third electric signal with the first divided voltage, said first comparator producing the output signal when the level of the third electric signal is higher than the first divided voltage, said first comparator ceasing the output signal when the level of the third electric signal is lower than the first divided voltage; and a second comparator connected to said second electrically operated valve for comparing the level of the third electric signal with the second divided voltage, said second comparator producing the output signal when the level of the third electric signal is lower than the second divided voltage, said second comparator ceasing the output signal when the level of the third electric signal is higher than the second divided voltage.

5. An exhaust gas recirculation system as claimed in claim 3, wherein said drive ciucuit includes a first voltage divider for producing a first divided voltage in accordance with the electric analog signal; and a second voltage divider for producing a second divided voltage in accordance with the electric analog signal, the second divided voltage being higher than the first divided voltage by a predetermined value to define said predetermined range; and wherein said means includes a first comparator connected to said second electrically operated valve for comparing the level of the third electric signal with the first divided voltage, said first comparator producing the output signal when the level of the third electric signal is lower than the first divided voltage, said first comparator ceasing the output signal when the level of the third electric signal is higher than the first divided voltage; and a second comparator connected to said first electrically operated valve for comparing the level of the third electric signal with the second divided voltage, said second comparator producing the output signal when the level of the third electric signal is higher than the second divided voltage, said second comparator ceasing the output signal when the level of the third electric signal is lower than the second divided voltage.

6. An exhaust gas recirculation system as claimed in claim 1, wherein said second flow control means includes a servomotor having a housing, a spring-loaded flexible diaphragm disposed within said housing to subdivide the interior of said housing into a pair of chambers, one of said chambers being connected to the exterior, the other being connected to said induction pipe through said first electrically operated valve and to the exterior through said second electrically operated valve, a control valve provided within said recirculation pipe and coupled to said diaphragm through one of said chambers to control the flow quantity of exhaust gases therethrough.

* * * * *